United States Patent [19]
Shank et al.

[11] Patent Number: 5,922,030
[45] Date of Patent: Jul. 13, 1999

[54] METHOD AND SYSTEM FOR CONTROLLING A SOLID PRODUCT RELEASE MECHANISM

[75] Inventors: David Shank, Big Rapids; Robert E. Taylor, Cadillac, both of Mich.

[73] Assignee: Nartron Corporation, Reed City, Mich.

[21] Appl. No.: 08/772,027

[22] Filed: Dec. 19, 1996

Related U.S. Application Data

[60] Provisional application No. 60/008,957, Dec. 20, 1995.

[51] Int. Cl.$^6$ ........................................................ G06F 7/00
[52] U.S. Cl. ........................... 700/479.01; 222/56; 222/1; 141/94; 62/125
[58] Field of Search .................... 700/479.01; 222/56, 222/1; 141/94, 95; 62/125, 126; 209/590

[56] References Cited

U.S. PATENT DOCUMENTS

| | | | |
|---|---|---|---|
| 4,071,168 | 1/1978 | Stone | 222/56 |
| 4,635,444 | 1/1987 | Mawby et al. | 62/125 |
| 4,675,660 | 6/1987 | Boscolo | 141/95 |
| 4,680,943 | 7/1987 | Mawby et al. | 62/300 |
| 4,733,381 | 3/1988 | Farmer et al. | 141/94 |
| 4,822,996 | 4/1989 | Lind | 250/222.1 |
| 5,060,484 | 10/1991 | Bush et al. | 62/137 |
| 5,182,925 | 2/1993 | Alvarez et al. | 62/347 |
| 5,261,248 | 11/1993 | Willis et al. | 62/137 |
| 5,369,375 | 11/1994 | Cooper et al. | 329/347 |
| 5,573,041 | 11/1996 | Skell et al. | 141/94 |

FOREIGN PATENT DOCUMENTS 6290037   6/1996   Japan .

*Primary Examiner*—William E. Terrell
*Assistant Examiner*—Khoi H. Tran
*Attorney, Agent, or Firm*—Brooks & Kushman P.C.

[57] ABSTRACT

A method and system for controlling a solid product release mechanism to control the level of solid products in a storage bin. An acoustical wave is transmitted across either a passage of a delivery chute or a cavity of the storage bin. The strength of the transmitted acoustical wave is sensed. As the solid products fall from the release mechanism into the delivery chute or storage bin, a change in the strength of the acoustical wave signal is sensed. A control signal is generated to control the release mechanism when the change in the strength of the transmitted acoustical wave exceeds a predetermined threshold for more than a predetermined amount of time. A method and system is also provided for controlling an ice release mechanism in an automatic ice-making machine. A method and system is provided for automatically calibrating an ultrasonic ranging sensor used in determining the level of solid products in a storage bin. An apparatus is also provided for controlling a solid product release mechanism to control the level of solid products in a storage bin.

51 Claims, 6 Drawing Sheets

METHOD AND SYSTEM FOR CONTROLLING A SOLID PRODUCT RELEASE MECHANISM

This application claims benefit of provisional application No. 60/008,957 filed Dec. 20, 1995.

TECHNICAL FIELD

This invention relates to a method and system for automatically controlling a solid product release mechanism, such as an ice release mechanism of an automatic ice-making machine, to control the level of solid products in a storage bin associate therewith.

BACKGROUND ART

In conjunction with solid product release mechanisms, it is often necessary to determine when additional product needs to be released or when enough product has been released. When a storage bin is full, it is desirable to prevent the release of additional products; and conversely, when the storage bin is empty, it is desirable to automatically release more products. However, determining the level of accumulation of solid products, such as ice, is difficult due to the irregular arrangement of the solid products.

For instance, in automatic ice-making machine applications, several known methods have been developed for determining the level of accumulation of ice in a storage bin. One known method of determining the fill level of the storage bin makes use of a sensing arm as disclosed in U.S. Pat. Nos. 5,261,248, issued to Willis et al., 4,635,444, issued to Mawby et al., and 4,680,943, issued to Mawby et al. However, contact sensors will produce inaccurate results if the objects being sensed do not come into contact with the sensor.

Alternatively, non-contact sensors, such as optical interruption or proximity sensors, ultrasonic proximity sensors, capacitive proximity sensors and magnetic proximity sensors can be used to determine the fill level of an ice storage bin. For example, U.S. Pat. No. 4,822,996, issued to Lind discloses the use of a light interrupter system to determine the level of ice in a storage bin. These types of sensors, however, have varied responses due to contamination and changes in material. There is also a significant cost associated with these types of sensors.

For example, a two-element sensor that indicates when a storage bin needs to be refilled, i.e., "bin refill", and when the bin is full, i.e., "bin full", requires a spacing between the two sensors which necessarily depends on the shape and dimensions of the storage bin. The two sensors may be farther apart in a tall storage bin versus a shorter storage bin. In this application, the two sensor configurations are not interchangeable and have to be matched to the particular storage bin used.

A common solution is to pre-configure the sensor for a given type of storage bin. Another solution is to pre-calibrate the sensor of a given type of storage bin and mount that sensor only on that type of storage bin.

Another problem arises in that, even if two storage bins are identical, the release mechanisms and the product released may vary from application to application. With a fast responding release mechanism in a constant usage situation, it might be desirable to have a "bin refill" level set at a comparably low level, thereby decreasing the number of times that the release mechanism is cycled on and off. However, if the release mechanism is slow to respond and usage is heavy but intermittent, the "bin refill" level might be set higher to prevent the storage bin from being emptied before the mechanism can respond. With light usage applications, the "bin refill" level could be set lower to minimize cycling since there would be time to refill the storage bin before the bin is emptied.

To accommodate variations in the "bin refill" level at a user's location, the sensors are configurable at the point of application. In the case of discrete sensors, the separation between the two sensors must be physically changed. Since the sensors are accessible and movable, the sensors are susceptible to shock and vibration.

An alternative to using an array of discrete sensors is to use a single ranging sensor that can operate over a broad range of bin depths. One such sensor type is found in U.S. Pat. No. 5,182,925, issued to Alvarez et al. The level of ice in the storage bin is determined based on the amount of time it takes to receive an echo of a transmitted signal. However, a storage bin equipped with such a sensor still requires the sensor or control system set for the desired "bin refill" and "bin full" values. Additionally, when an indication of the amount of material in the bin is required, it is also desirable to have the system set for "bin empty."

As in sensor arrays, it is possible to have a controller for the release mechanism or a controller for the ultrasonic ranging sensor preset. In such cases, the controller is pre-loaded with the appropriate values for a given storage bin type in a given application for a specific product type with a specific usage rate. However, this forces the sensor and/or release mechanism manufacturer to track and control the assembly, and stock and ship numerous system types. It also limits the end user's flexibility and complicates sensor repair or replacement.

DISCLOSURE OF THE INVENTION

It is thus a general object of the present invention to provide a method and system for determining the fill level of a storage bin associated with a solid product release mechanism.

It is another object of the present invention to provide a method and system for automatically controlling a solid product release mechanism to control the level of solid products in a storage bin.

It is yet another object of the present invention to provide a method and system for automatically controlling the making of ice in an automatic ice-making machine based on the fill level of a storage bin associated with the ice-making machine.

It is a further object of the present invention to provide a method and system for calibrating an ultrasonic sensor at an end user's site as the sensor is mounted onto a specific storage bin.

Still further, it is an object of the present invention to provide an apparatus for determining the fill level of a storage bin associated with a solid product release mechanism.

In carrying out the above objects and other objects, features and advantages of the present invention, a method is provided for controlling a solid product release mechanism to control the level of solid products in a storage bin associated therewith by monitoring the solid products as they pass through a delivery chute. The method includes the step of transmitting an acoustical wave across a passage of the delivery chute wherein the acoustical wave has a predetermined frequency based on a resonance of the delivery chute. The method also includes the step of sensing a strength of the transmitted acoustical wave after the acoustical wave has traversed across the passage. The method further includes the step of releasing the solid products into the passage of the delivery chute so as to change the strength of the transmitted acoustical wave. Still further, the method includes the step of sensing the change in the strength of the transmitted acoustical wave. The method concludes with the step of generating a control signal when the change in the strength exceeds a predetermined threshold for more than a predetermined amount of time wherein the control signal is utilized to prevent the solid product release mechanism from releasing additional solid product.

A system is provided for carrying out the steps of the above-described method. The system includes a transmitter for transmitting an acoustical wave across the passage of the delivery chute. The system also includes a sensor for sensing a strength of the transmitted acoustical wave and for sensing a change in the strength of the transmitted acoustical wave. The system further includes means for releasing the solid products into the passage of the delivery chute so as to change the strength of the transmitted acoustical wave. Still further, the system includes means for generating a control signal when the change in the strength exceeds a predetermined threshold for more than a predetermined amount of time wherein the control signal is utilized to prevent the solid product release mechanism from releasing additional solid product.

In carrying out the above objects and other objects, features and advantages of the present invention, a method is provided for controlling a solid product release mechanism to control the level of solid products in a storage bin by monitoring the solid products as they fall into the storage bin. The method includes the step of transmitting an acoustical wave across a cavity of the storage bin wherein the acoustical wave has a predetermined frequency based on a resonance of the storage bin. The method further includes the step of sensing a strength of the transmitted acoustical wave after the acoustical wave has traversed across the cavity. Still further, the method includes the step of releasing the solid products into the cavity of the storage bin so as to change the strength of the transmitted acoustical wave. The method further includes the step of sensing the change in the change in the transmitted acoustical wave. The method concludes with the step of generating a control signal when the change in the strength exceeds a predetermined threshold for more than a predetermined amount of time wherein the control signal is utilized to prevent the solid product release mechanism from releasing additional solid product.

A system is provided for carrying out the steps of the above-described method. The system includes a transmitter for transmitting an acoustical wave across the cavity of the storage bin. The system also includes a sensor for sensing the strength of the transmitted acoustical wave and for sensing a change in the strength of the transmitted acoustical wave. The system further includes means for releasing the solid product into the cavity of the storage bin so as to change the strength of the transmitted acoustical wave. The system further includes means for generating a control signal when the change in the strength exceeds a predetermined threshold for more than a predetermined amount of time wherein the control signal is utilized to prevent the solid product release mechanism from releasing additional solid product.

In further carrying out the above objects and other objects, features and advantages of the present invention, a method is provided for controlling an ice release mechanism of an ice-making machine to control the level of the ice in a storage bin associated therewith. The method includes the step of transmitting an acoustical wave across one of a passage of a delivery chute and a cavity of the storage bin wherein the acoustical wave has a predetermined frequency based on a resonance of one of the delivery chute and the storage bin. The method also includes the step of sensing a strength of the transmitted acoustical wave after the acoustical wave has traversed across the one of the passage and the cavity. The method further includes the step of releasing the ice into the one of the passage and the cavity so as to change the strength of the transmitted acoustical wave. Still further, the method includes the step of sensing the change in the strength of the transmitted acoustical wave. The method concludes with the step of generating a control signal when the change in the strength exceeds a predetermined threshold for more than a predetermined amount of time wherein the control signal is utilized to prevent the ice release mechanism from releasing additional ice.

A system is also provided for carrying out the steps of the above-described method. The system includes a transmitter for transmitting an acoustical wave across one of a passage of a delivery chute and a cavity of the storage bin. The system also includes a sensor for sensing a strength of the transmitted acoustical wave after the acoustical wave has traversed across the one of the passage and the cavity and for sensing a change in the strength in the transmitted acoustical wave. The system further includes means for releasing the ice into the one of the passage and the cavity so as to change the strength of the transmitted acoustical wave. The system further includes means for generating a control signal when the change in the strength exceeds a predetermined threshold for more than a predetermined amount of time wherein the control signal is utilized to prevent the ice release mechanism from releasing additional ice.

In further carrying out the above objects and other objects, features and advantages, of the present invention, a method is provided for calibrating an ultrasonic sensor which is used for determining the level of solid products in a storage bin. The method includes the steps of determining whether the storage bin is empty and generating a first ultrasonic signal at a first time period. The method also includes the step of sensing the first ultrasonic signal at a second time period. The method further includes the step of processing the first ultrasonic signal to obtain a bin-empty depth based on the first time period and the second time period. The method finally includes the step of storing the bin-empty depth in a memory associated with the ultrasonic sensor.

A system is provided for carrying out the steps of the above-described method. The system includes means for determining whether the storage bin is empty. The system also includes means for generating a first ultrasonic signal at a first time period when the storage bin is empty. The system further includes a sensor for sensing the first ultrasonic signal at a second time period. Still further, the system includes a processor for processing the first ultrasonic signal to obtain a bin-empty depth based on the first time period and the second time period. The system finally includes means for storing the bin-empty depth in a memory associated with the ultrasonic sensor.

In further carrying out the above objects and other objects, features and advantages, of the present invention, an apparatus is provided for automatically controlling a solid product release mechanism to control the level of solid products in a storage bin associated therewith. The apparatus includes a transmitter for transmitting an acoustical wave. The apparatus also includes a sensor for sensing a strength of the transmitted acoustical wave and for sensing the change in the strength in the transmitted acoustical wave. The apparatus further includes a controller for allowing at least one solid product to fall from the release mechanism so as to change the strength of the transmitted acoustical wave. Still further, the controller is provided for generating a control signal when the change in the strength exceeds a predetermined threshold for more than a predetermined amount of time wherein the control signal is utilized to prevent the solid product release mechanism from releasing additional solid product.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
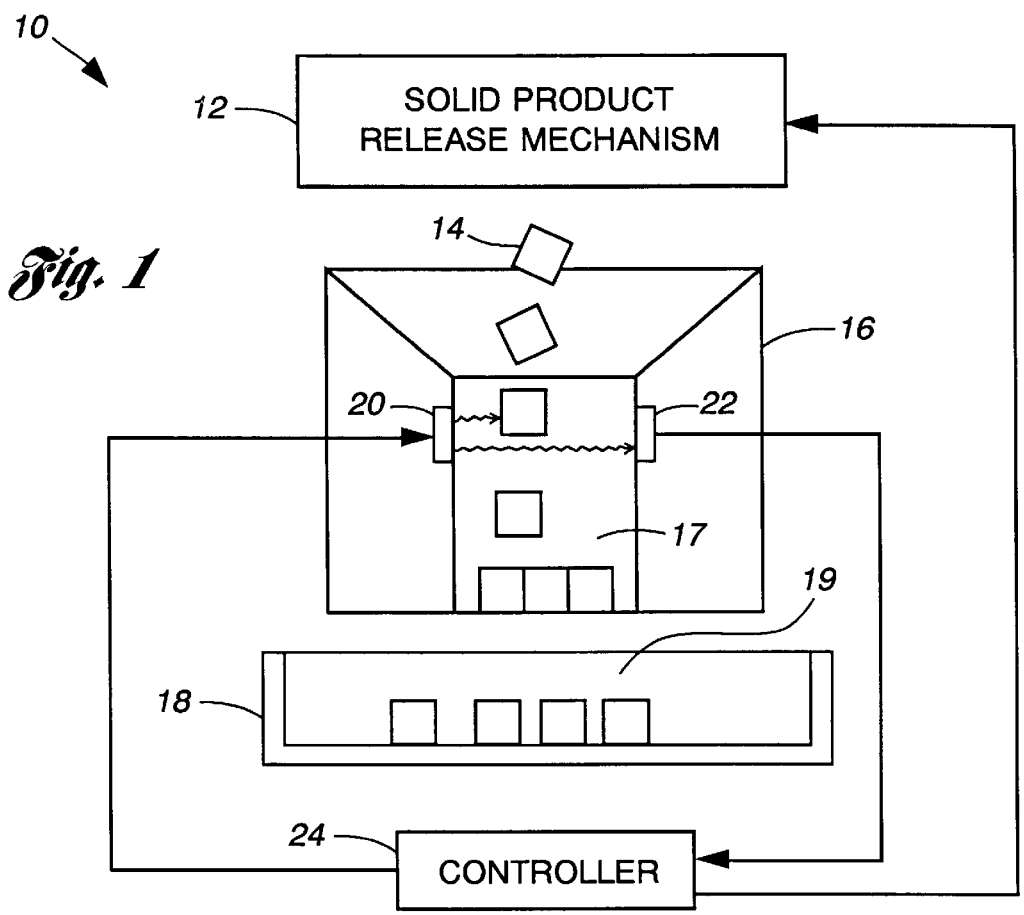
FIG. 1 is a block diagram of one embodiment of the present invention.

Turning now to FIG. 1, there is shown a block diagram of the system of the present invention, denoted generally by reference numeral 10. The system 10 includes a solid product release mechanism 12 for releasing a plurality of solid products 14, e.g., ice, rocks, ball bearings, etc. The system 10 also includes a delivery chute 16 having a passage 17 for guiding the solid products released from the release mechanism 12. The delivery chute 16 may have a storage area in one embodiment of the present invention.

The system 10 further includes a storage bin 18 having a cavity 19 for receiving and storing the solid products 14. The storage bin 18 may be a portion of a truck which is positioned under the delivery chute 16 to receive the solid products 14, such as rocks, cement, etc. Alternatively, the storage bin 18 may be a box or similar container that travels along a conveyor belt to receive the solid products 14 from the delivery chute 16.

The system 10 also includes a transmitter 20 for transmitting an acoustical wave across either the passage 17 of the delivery chute 16 or the cavity 19 of the storage bin 18. The acoustical wave has a predetermined frequency based on a resonance of either the delivery chute 16 or the storage bin 18. The system 10 further includes a sensor 22 for sensing the strength of the acoustical wave signal transmitted by the transmitter 20. The sensor 22 may be mounted opposite the transmitter 20, or it can be mounted adjacent to the transmitter 20. The transmitter 20 may be a speaker or a piezoelectric element. If a piezoelectric element is used, the piezoelectric element may function as both the transmitter 20 and the sensor 22. If other transmitters, such as a conventional speaker, are used, a separate sensor, such as a microphone, is required.

A controller 24 is also provided in communication with the transmitter 20, the sensor 22 and the release mechanism 12. The controller 24 processes the signal received by the sensor 22 and generates a control signal accordingly. If the controller 24 determines the storage bin 18 is full, a control signal is generated to prevent the release mechanism 12 from releasing additional solid products 14. Conversely, if the controller 24 determines the storage bin 18 is empty or semi-full, a control signal is generated to allow the release of additional solid products 14 by the release mechanism 12.

In a first embodiment, the transmitter 20 is positioned so that it transmits the acoustical wave across the passage 17 of the delivery chute 16, as shown in FIG. 1. The acoustical wave is transmitted at a frequency that results in a resonance of either the passage 17 or of the physical structure of the delivery chute 16. In the case in which the delivery chute 16 includes a storage area, the acoustical wave may be transmitted across the passage 17 of the delivery chute 16 at a predetermined frequency based on a resonance of the passage 17 of the delivery chute 16. The solid products 14 entering the passage 17 then alter the volume and sound path. This results in a disruption of the resonance condition and a drop in the amplitude of the sound detected at the sensor 22. Once a change in the strength of acoustical wave has occurred, product is assumed to be delivered until the resonance condition has been restored for a predetermined time interval. When change in the strength exceeds a predetermined threshold for more than a predetermined amount of time, or when the change continues when it is known that no product can be released, the delivery chute 16 is assumed to be filled with the solid products 14. A change in the strength of the transmitted acoustical wave must exceed a predetermined threshold to account for sensitivity of the sensor 22 or for temperature variations in the delivery chute 16.

Alternatively, the resonance may be chosen so that it couples only to the structure of the delivery chute 16 and not to the air in the passage 17 in applications in which the delivery chute 16 is affixed to or in close proximity to the storage bin 18. In this embodiment, the resonance will be affected only when the solid product 14 comes into contact with the walls of the delivery chute 16. Intermittent variations in resonance frequency and/or amplitude are then interpreted as being due to released product striking the walls of the delivery chute 16. A continuous and constant change in resonance frequency and/or amplitude is interpreted as being due to product being in continuous static contact with the walls of the delivery chute 16. Such a change in resonance would be interpreted as an indication of the storage bin 18 being full or the delivery chute 16 being clogged. A full condition would force the solid products 14 into continuous contact with the delivery chute 16 as would a "logjam" of product in the passage 17.

In the case in which the acoustical wave is generated across the cavity 19 of the storage bin 18, the acoustical wave is transmitted at a predetermined frequency based on a resonance of the cavity 19 of the storage bin 18. The transmitter 20 and the sensor 22 would be positioned on the walls of the storage bin 18. As described above, the solid products 14 entering the cavity 19 then alter the volume and sound path. Once a change in the strength of the acoustical wave exceeds a predetermined threshold for more than a predetermined amount of time, a control signal is generated to prevent the solid product release mechanism 12 from releasing additional solid product into the storage bin 18.

Figure 2:
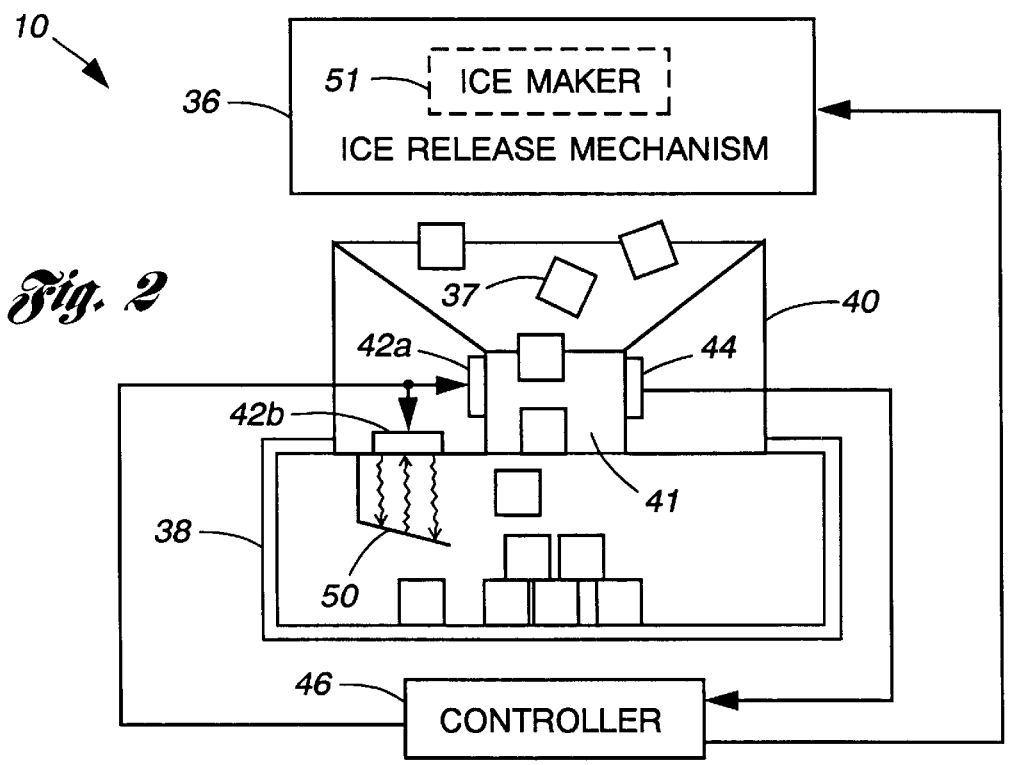
FIG. 2 is a block diagram of a second embodiment of the present invention used in conjunction with an automatic ice-making machine.

Turning now to FIG. 2, there is shown a block diagram of the system 10 of the present invention used in conjunction with an automatic ice-making machine. The automatic ice-making machine includes an ice release mechanism 36 for releasing ice 37 and a storage bin 38 having a cavity 39 for receiving and storing the ice 37. The ice 37 may be guided from the ice release mechanism 36 to the storage bin 38 via a delivery chute 40. The delivery chute 40 includes a passage 41 through which the ice 37 pass. A transmitter 42a and a sensor 44 are coupled to the walls of the delivery chute 40. Furthermore, a controller 46 is provided in communication with the transmitter 42a, the sensor 44 and the ice release mechanism 36. The acoustical wave signals are transmitted across the passage 41 of the delivery chute 40. The acoustical wave signals may be transmitted at a predetermined frequency based on the resonance of either the passage 41 or the physical structure of the delivery chute 40. The acoustical wave signals are then sensed and processed in the same manner as previously described. As the level of ice 37 reaches a "full" level in the storage bin 38, the ice 37 will begin to accumulate in the passage 41 of the delivery chute 40 and cause a continuous change in the resonance of either the passage 41 or the structure of the delivery chute 40.

Ideally, the transmitter 42a is operated at ultrasonic frequencies above the nominal 20 KHz limit of human audio sensitivity. Alternatively, the system 10 could be operated at audio levels below those of the environment in which the system 10 is employed. For example, in the case of an automatic ice-making machine, compressor and fan noise can mask the audio output of the transmitter 42a. A further complication occurs in that the speed of sound changes with temperature. This, in turn, will alter the frequency at which resonance can occur. This difficulty can be overcome by having the transmitter 42a continuously swept across the range of frequencies over which a desired resonance can be expected to move with variations in temperature.

In an adaptive approach, the frequency would be altered using feedback to stay at a resonance within a given range of frequencies (the range expected due to temperature variations). Objects disrupting the resonance would result in rapidly changing and/or out-of-range resonant frequency changes that the adaptation would not be able to keep up with. This can be guaranteed by allowing only a slow adaptation.

As shown in FIG. 2, the transmitter 42b is alternatively equipped with a deflector plate 50 placed below the chute 40 in the storage bin 38. The transmitter 42b is operated in a resonance detection mode as previously described with the resonance being the resonant frequency of the cavity 39 of the storage bin 38. The deflector plate 50, preferably angled, makes possible a resonance frequency F occurring within a predetermined frequency range irrespective of the size of the storage bin 38. A calibration step may be used to determine the actual resonant frequency F when the deflector plate 50 is not obstructed. When the storage bin 38 becomes sufficiently full, the ice 37 will come into contact with the deflector plate 50 and eventually move into the space between the deflector plate 50 and the transmitter 42b. When this occurs, the resonance is changed in frequency and/or amplitude, thus indicating a full storage bin 38.

Figure 3:
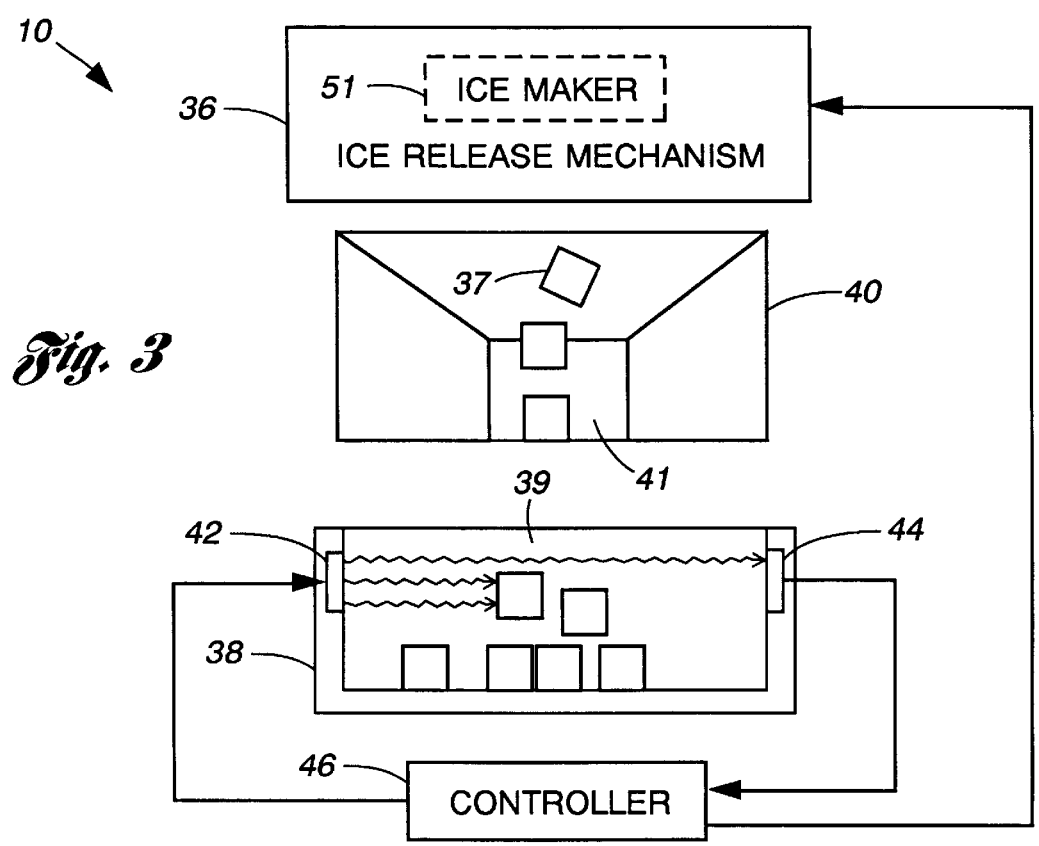
FIG. 3 is a block diagram of a third embodiment of the present invention used in conjunction with an automatic ice-making machine.

Turning now to FIG. 3, there is shown a further embodiment of the present invention used in conjunction with an automatic ice-making machine. In this embodiment, the transmitter 42 is secured to a wall of the storage bin 38 so that the acoustical waves are transmitted across the cavity 39 of the storage bin 38. The sensor 44 is also mounted on a wall of the storage bin 38, either opposite the transmitter 42 or on the same wall of the transmitter 42. The acoustical waves are transmitted at a frequency having a resonance based on the cavity 39 of the storage bin 38. As described above, the ice 37 entering the cavity 39 will alter the volume and sound path resulting in a disruption of the resonance condition and a drop in the amplitude of the sound detected at the sensor 44. Once the change in the strength exceeds a predetermined threshold for more than a predetermined amount of time, the controller 46 generates a control signal to prevent the ice release mechanism 36 from releasing additional ice into the storage bin 38.

In the automatic ice-making machine application, the ice release mechanism 36 may include an ice maker 51 for making ice. In these applications, the control signal generated by the controller 46 is utilized to prevent the making of ice 37 by the ice maker 51.

Figure 4:
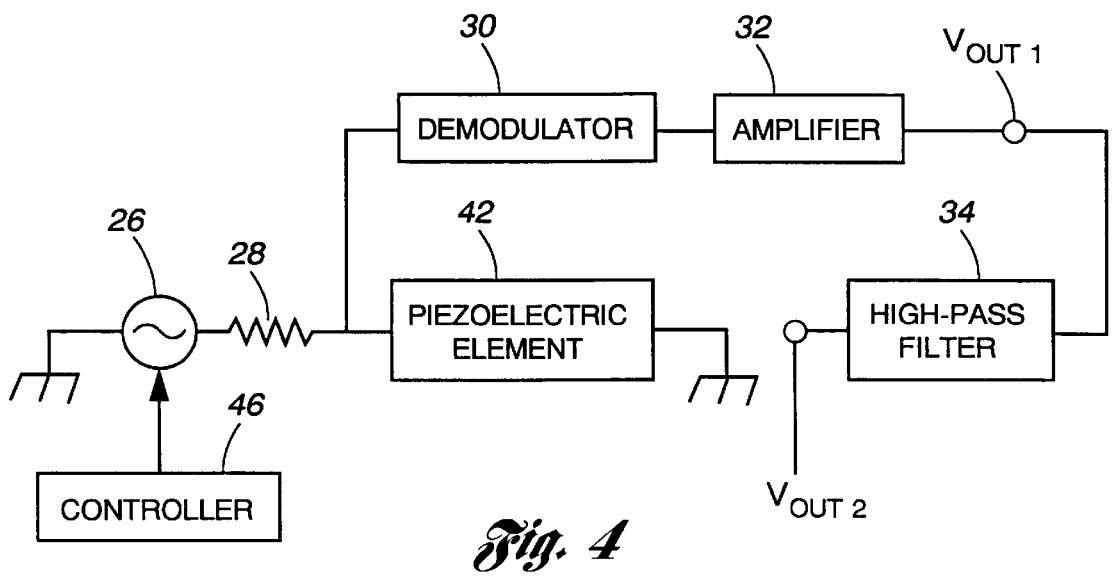
FIG. 4 is a block diagram of a circuit for driving a vibration source used in conjunction with the present invention.

In an alternative embodiment, the transmitter 42 is a vibration source, such as a piezoelectric element or a solenoid. The vibration source is driven with a circuit such as that shown in FIG. 4. An alternating current (AC) source 26 controlled by the controller 46 drives a resistor 28 and the transmitter 42, or piezoelectric element, in electrical series. A demodulator 30 is utilized to determine the amplitude of the electrical signal across the piezoelectric element. An amplifier 32 coupled to the demodulator 30 is utilized to buffer or amplify the output of the demodulator 30 and provide a voltage output Vout1. An optional high-pass filter 34 may be added to provide a high-pass filtered output Vout2.

When the piezoelectric element and the delivery chute 40 are in resonance, the impedance across the piezoelectric element can be expected to be at a minimum. In operation, a calibration step is used to determine the resonant frequency of the delivery chute 40 and the piezoelectric element. In the calibration step, the piezoelectric element is swept across a predetermined range of frequencies and Vout1 is monitored for the frequency(s) at which Vout1 reaches a minimum. Ideally, the calibration step is performed when no ice 37 is present. The controller 46 then stores the frequency(s) F at which Vout1 was minimal and, optionally, the value of the voltage V at which Vout1 is at a minimum. The transmitter 42 is then excited at frequency F.

The voltage Vout1 is continuously read and compared to V and/or the high-pass filtered Vout2 is monitored. When the ice 37 falls through the passage 41 of the delivery chute 40, the ice 37 alters the resonance of delivery chute 40 resulting in a change in the impedance of the piezoelectric element. A rapid change will result in an output at Vout1 or Vout2 which can then be compared to a predetermined threshold value. This comparison can be made in the controller 46 or in electronics external to the controller 46. Continuous monitoring of Vout1 and comparison to V will also detect changes in Vout1. Changes in Vout1 and/or Vout2 are indications of the presence of ice 37 in the delivery chute 40.

When the delivery chute 40 becomes filled with the ice 37, Vout1 will remain different from V. A predetermined number of samples of Vout1 differing from V by more than a predetermined amount can be used as an indication of the delivery chute 40 being filled with product. However, if the value of Vout1 is continuously changing and/or if Vout2 is non-zero, this would indicate that the ice 37 is moving through the passage 41 of the delivery chute 40. If the value of Vout1 remains constant and/or the value of Vout2 becomes negligible (below a predetermined threshold), this would indicate that the ice 37 in the delivery chute 40 are static and the delivery chute 40 is full or blocked.

Figure 5:
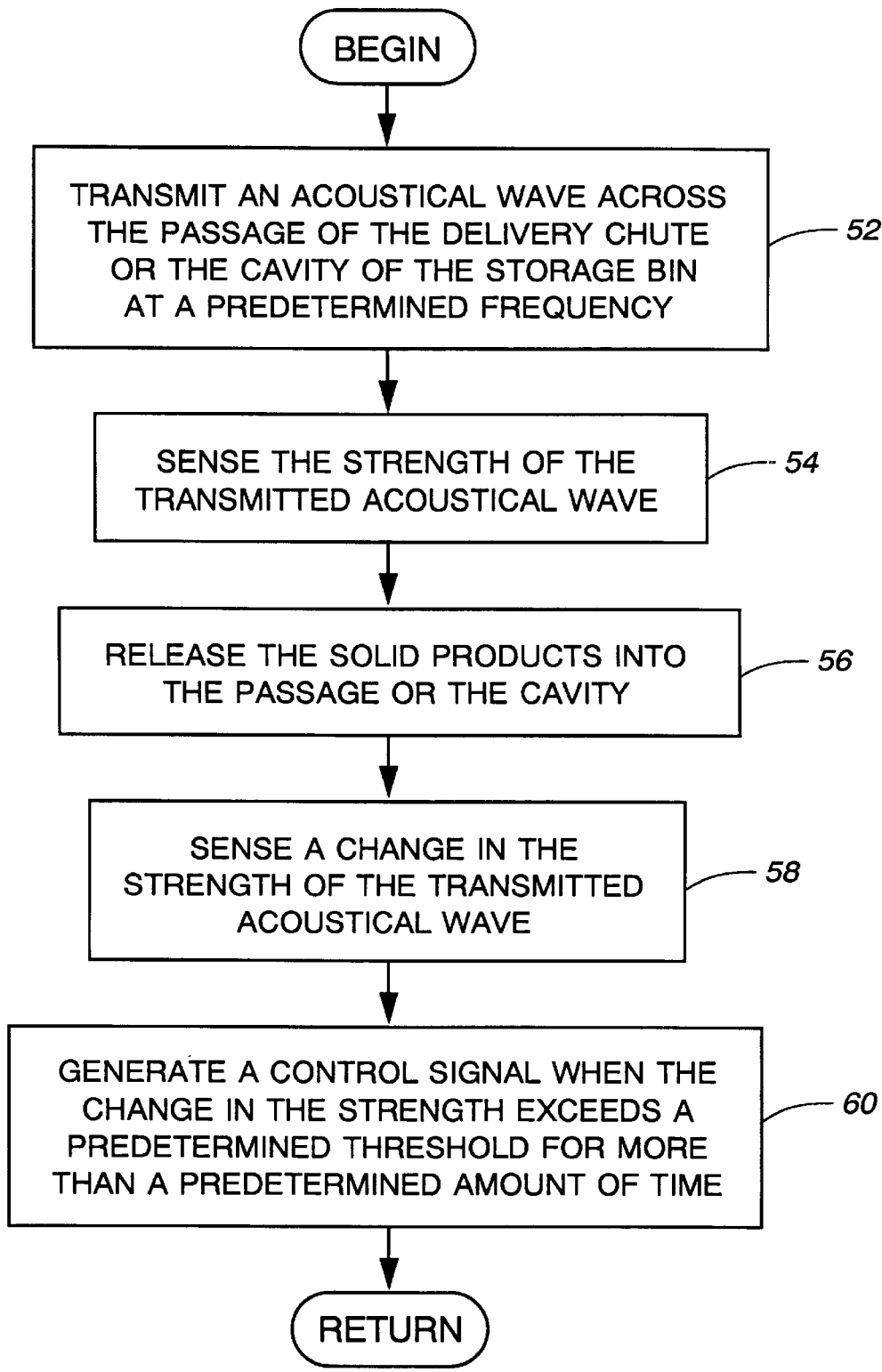
FIG. 5 is a flow diagram illustrating the general sequence of steps associated with the operation of one embodiment of the present invention.

Referring now to FIG. 5, there is shown a flow diagram illustrating the general sequence of steps associated with the present invention. The method begins with the step of transmitting an acoustical wave at a predetermined frequency across the passage of the delivery chute or the cavity of the storage bin, as shown at block 52. The predetermined frequency is based on the resonance of either the delivery chute or the storage bin or the resonance of the air in the passage or the cavity.

The method continues with the step sensing a strength of the transmitted acoustical wave upon traversing the passage or the cavity, as shown by block 54. Next, the solid products are released into the passage or the cavity, as shown by block 56. As the solid products fall, the solid products cause a change in the strength of the transmitted acoustical wave.

The change in the strength of the transmitted acoustical wave is sensed, as shown by block 58. If the change in the strength exceeds a predetermined threshold for more than a predetermined amount of time, then a control signal is generated, indicating that the storage bin is full, as shown by block 60. The control signal is utilized to prevent the release mechanism from releasing more product into the delivery chute and the storage bin. In the ice-making machine application, the control signal may be utilized to prevent the making of ice.

Figure 6:
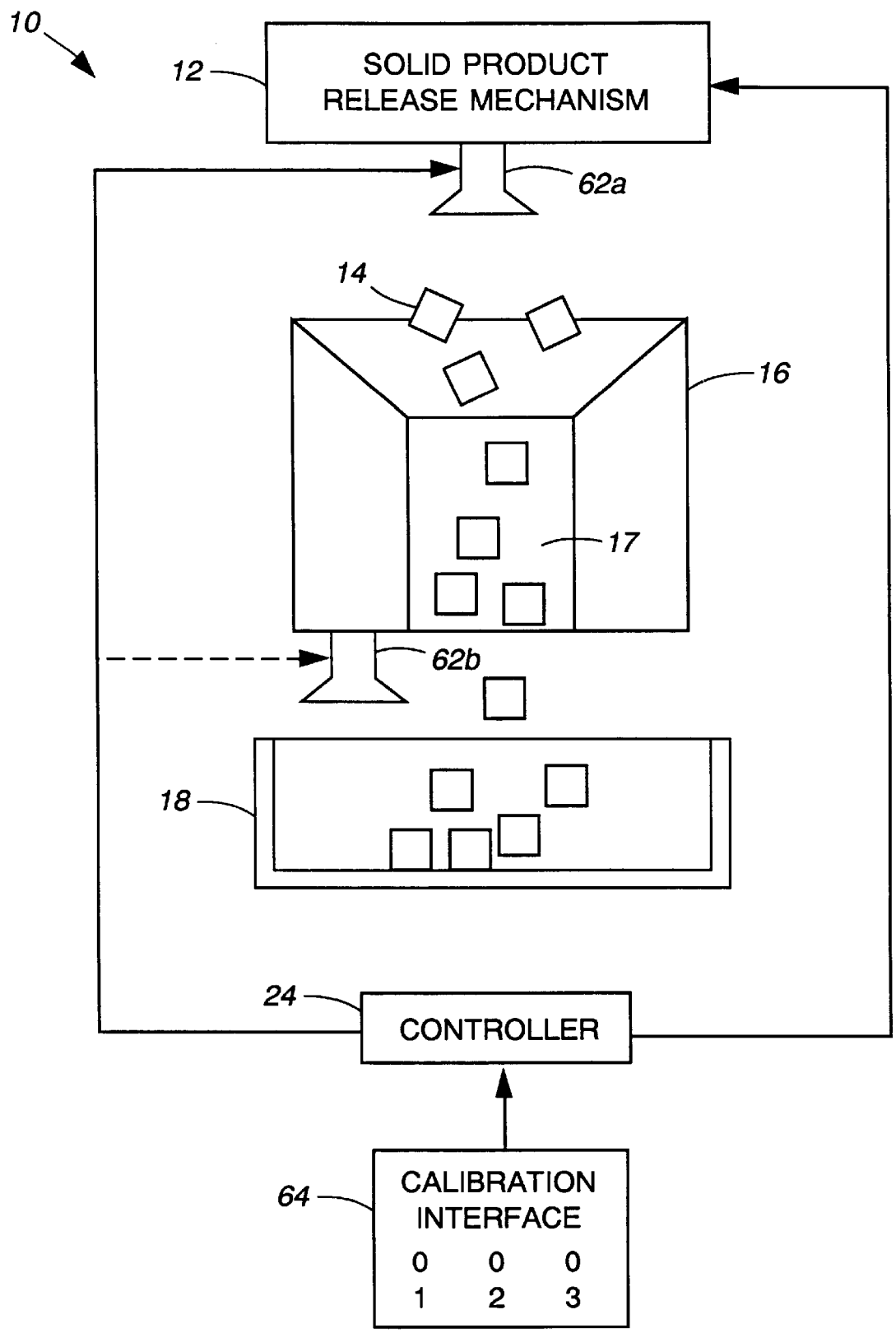
FIG. 6 is a block diagram of an alternative embodiment of the present invention utilizing an ultrasonic ranging sensor.

In a final embodiment, an ultrasonic ranging sensor 62 is positioned either above the delivery chute 16, as shown in FIG. 6 or above the storage bin 18. The ultrasonic ranging sensor 62 generates a signal and receives the echo of the signal at a delayed time. Based on the time of flight of the echo, the degree of filling in the storage bin 18 can be determined. Any solid products 14 falling into the storage bin 16 causes rapid variations in time of flight measurements. These rapid variations can then be used as an indication of the solid products 14 being delivered to the storage bin 18.

The ultrasonic ranging sensor 62 may be pulsed at intervals while the receiver portion of the sensor 62 may be interrogated continuously or at and between the emission intervals. Although the ultrasonic ranging sensor 62 is shown as acting as both the transmitter and the receiver, the ultrasonic ranging sensor 62 may comprise a separate transmitter and a separate receiver. The strength of emission is automatically controlled to maintain a constant signal to noise ratio between the strength of return pulses and the strength of the background noise measured between the pulses. The signal-to-noise ratio is then maintained at a constant. In a quiet environment, the emissions would be diminished while in a noisy environment, they would be increased. Additionally, this provides for adaptation to solid products that have sound absorption characteristics. In such cases, the return signal from a pulse is dampened requiring a louder emission to achieve acceptable performance.

A calibration interface 64 is provided in communication with the controller 24 for calibrating the ultrasonic ranging sensor 62 for a variety of storage bin types. Upon installation or when a change in system configuration or usage dictates, a user is able to do a three-point calibration. When the storage bin 16 is empty, the user pushes the #2 button on the calibration interface 64. The sensor 62 then measures the depth from the sensor 62 to the bottom of the storage bin 16. This depth is then stored in the sensor 62 or in the controller 24.

Similarly, when the storage bin is filled to the desired "full" or "refill" level, the user pushes the #1 or the #3 buttons, respectively. The depth is then measured again and recorded in the sensor 62 or the controller 24. When no calibration button is depressed, the sensor 62 simply performs a depth measurement. Signal processing and any computations are performed in the sensor 62 or the controller 24.

In FIG. 6, the calibration interface 64 is manual which provides for human operation. In a more complete embodiment, there may be a means for the system controller 24 to initiate calibration without human intervention. For example, consider a grain chute used to load railway cars. A calibration to find the bottom of each car is necessary. Different types of grain could have differing delivery rates which would require different "Bin Full" levels to account for delivery system hysteresis. An automatic control system would know when a new car was present and what grain type is to be delivered. The control system would then initiate a "Bin Empty" calibration and then look up the appropriate "Bin Full" value for the given car and grain combination. A rapid grain delivery could require a "Bin Full" that is further below the physical "full" level than would a slower grain delivery. This would occur if the rapid grain delivery had more grain in the pipeline than the slower grain delivery had. Other considerations would involve the specific fluid properties of the product being delivered, the type of system delivering it and the location of the delivery shutoff. For instance, delivery of scrap iron on a conveyor belt could be stopped immediately, whereas small plastic pellets being poured from a long duct would have to be emptied from the duct before the product delivery stopped if the shutoff were at the head of the duct.

Figure 7:
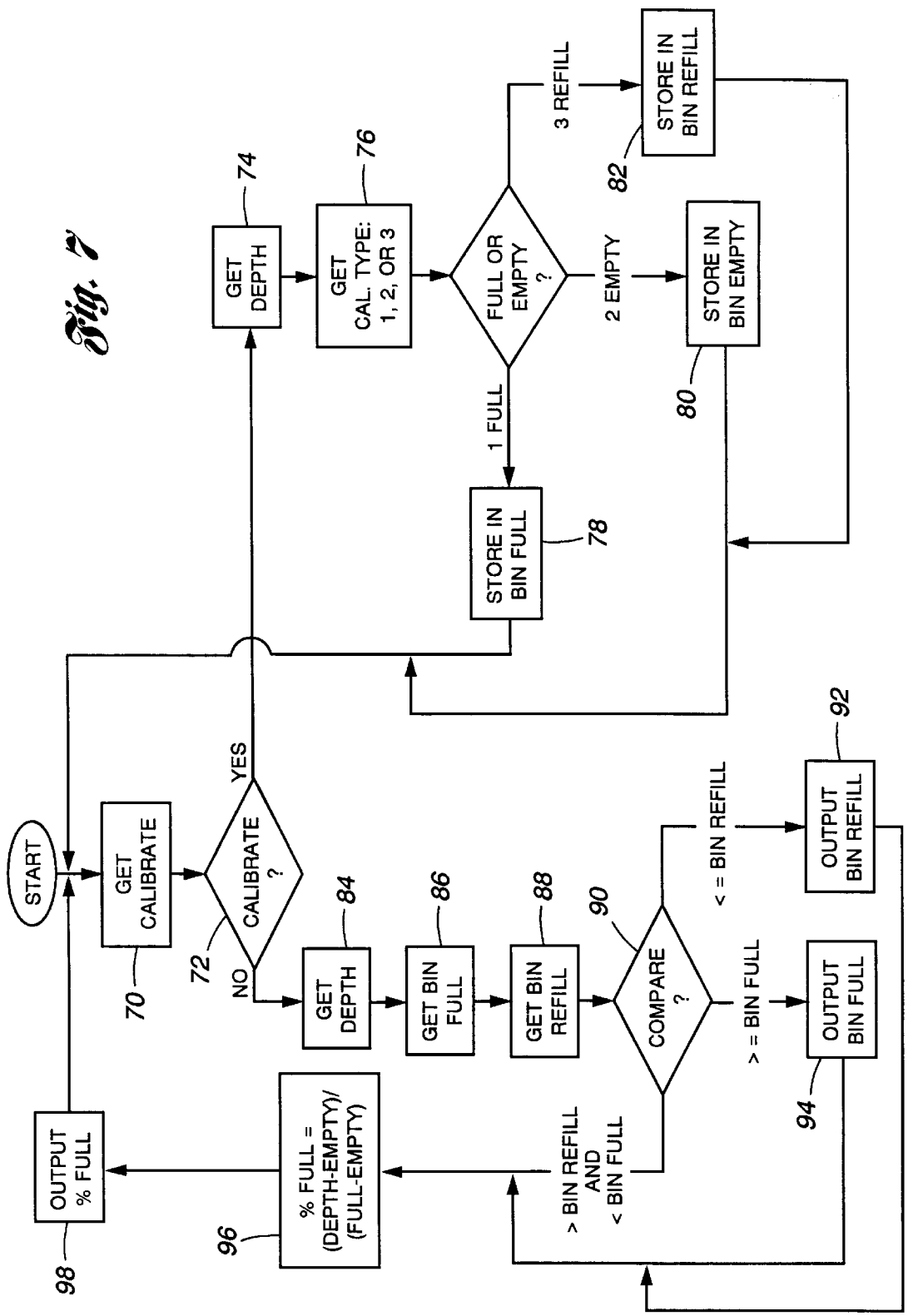
FIG. 7 is a flow diagram illustrating the general sequence of steps associated with the calibration operation of an ultrasonic ranging sensor.

A flow diagram illustrating the sequence of steps associated with this embodiment is shown in FIG. 7. The method begins with the first step of obtaining the calibration program from memory, as shown at block 70. The system then checks for whether or not a calibration button has been pressed, as shown by conditional block 72. If a calibration button has been pressed, the method proceeds to obtain a depth measurement of the storage bin, as shown by block 74.

Next, the method proceeds to determine which calibration button has been pressed, as shown by block 76. The calibration values are then stored in memory, as shown by blocks 78, 80, 82.

If a calibration button has not been pressed, the method proceeds to obtain a depth measurement of the storage bin, as shown by block 84. Next, the "Bin Full" and "Bin Refill" values are retrieved from memory, as shown by blocks 86, 88, respectively. The depth measurement is then compared to the "Bin Full" and "Bin Refill" values, as shown by conditional block 90.

If the depth measurement is less than or equal to the "Bin Refill" value, the method generates a "Bin Refill" signal, as shown by block 92, which is used to flag the system 10 to deliver more solid product 14 to the storage bin 16. If the depth measurement is greater than or equal to the "Bin Full" value, a "Bin Full" signal is generated, as shown by block 94, to flag the system 10 to end product delivery to the storage bin 16.

If the depth measurement is between the "Bin Refill" and "Bin Full" values, the method proceeds to determine a "% Full" value and generate a corresponding output, as shown by blocks 96 and 98, respectively. The "% Full" value is determined according to the following:

(Depth Measurement–"Bin Empty" depth)/("Bin Full" depth–"Bin Empty" depth).

Figure 8:
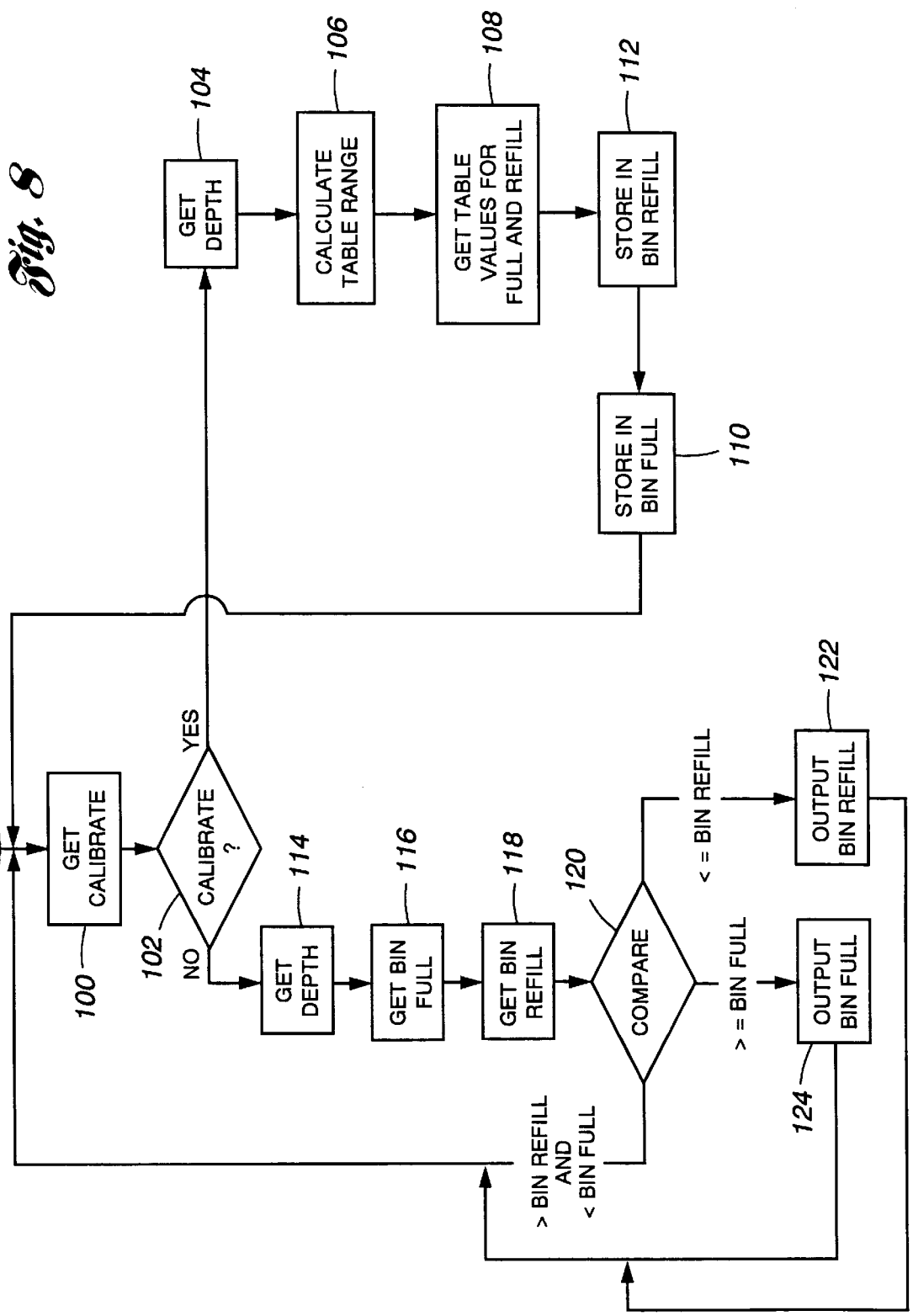
FIG. 8 is a flow diagram illustrating the general sequence of steps associated with an alternative calibration operation of an ultrasonic ranging sensor.

FIG. 8 shows a sequence of steps for a single calibration mode, i.e., "Bin Empty." In this system, the characteristics of all possible storage bins are stored in a table indexed to their "Bin Empty" values. After a calibration measurement of "Bin Empty", values for "Bin Refill" and "Bin Full" are retrieved from the table. The method begins with the step of obtaining the calibration program from memory, as shown by block 100. The method then proceeds to determine whether a calibration button has been pressed, as shown by conditional block 102.

If a calibration button has been pressed, a depth measurement for the "Bin Empty" condition is performed, as shown by block 104. Next, a table range is calculated, as shown by block 106. The values for "Bin Full" and "Bin Refill" are obtained from the table and stored in memory, as shown by blocks 108, 110 and 112, respectively.

If a calibration button has not been pressed, the method proceeds to obtain a depth measurement, as shown by block 114. The "Bin Full" and "Bin Refill" values are retrieved from memory, as shown by block 116 and 118, respectively. The depth measurement is then compared to the "Bin Full" and "Bin Refill" values, as shown by conditional block 120.

If the depth measurement is less than or equal to the "Bin Refill" value, a "Bin Refill" signal is generated, as shown by block 122. If the depth measurement is greater than or equal to the "Bin Full" value, a "Bin Full" signal is generated, as shown by block 124. If the depth measurement falls between the "Bin Refill" and "Bin Full" values, the method returns to the beginning of the program.

While the best modes for carrying out the invention have been described in detail, those familiar with the art to which this invention relates will recognize various alternative designs and embodiments for practicing the invention as defined by the following claims.

What is claimed is:

1. For use with a solid product release mechanism for releasing a plurality of solid products, a delivery chute having a passage for guiding the solid product from the solid product release mechanism to a storage bin, the storage bin for receiving and storing the solid product and having a cavity, a method for controlling the solid product release mechanism to control the level of solid products in the storage bin, the method comprising:

transmitting an acoustical wave across the passage of the delivery chute, the acoustical wave having a predetermined frequency based on a resonance of the delivery chute;

sensing a strength of the transmitted acoustical wave after the acoustical wave has traversed across the passage;

releasing the solid products into the passage of the delivery chute so as to change the strength of the transmitted acoustical wave;

sensing the change in the strength of the transmitted acoustical wave; and generating a control signal when the change in the strength exceeds a predetermined threshold for more than a predetermined amount of time wherein the control signal is utilized to prevent the solid product release mechanism from releasing additional solid product.

2. The method as recited in claim 1 wherein the resonance is a resonant frequency of the physical structure of the delivery chute.

3. The method as recited in claim 1 wherein the resonance is a resonant frequency of the passage of the delivery chute.

4. The method as recited in claim 1 wherein the strength of the transmitted acoustical wave is an amplitude.

5. For use with a solid product release mechanism for releasing a plurality of solid products, a delivery chute having a passage for guiding the solid product from the solid product release mechanism to a storage bin, the storage bin for receiving and storing the solid product and having a cavity, a method for controlling the solid product release mechanism to control the level of solid products in the storage, the method comprising:

transmitting an acoustical wave across the cavity of the storage bin, the acoustical wave having a predetermined frequency based on a resonance of the storage bin;

sensing a strength of the transmitted acoustical wave after the acoustical wave has traversed across the cavity;

releasing the solid products into the cavity of the storage bin so as to change the strength of the transmitted acoustical wave;

sensing the change in the strength of the transmitted acoustical wave; and generating a control signal when the change in the strength exceeds a predetermined threshold for more than a predetermined amount of time wherein the control signal is utilized to prevent the solid product release mechanism from releasing additional solid product.

6. The method as recited in claim 5 wherein the resonance is a resonant frequency of the cavity of the storage bin.

7. The method as recited in claim 5 wherein the strength of the transmitted acoustical wave is an amplitude.

8. For use with an automatic ice-making machine having an ice release mechanism for releasing ice, a delivery chute having a passage for guiding the ice from the ice release mechanism to a storage bin, the storage bin for receiving and storing the ice and having a cavity, a method for controlling the ice release mechanism to control the level of ice in the storage bin, the method comprising:

(a) transmitting an acoustical wave across one of the passage of the delivery chute and the cavity of the storage bin, the acoustical wave having a predetermined frequency based on a resonance of one of the delivery chute and the storage bin;

(b) sensing a strength of the transmitted acoustical wave after the acoustical wave has traversed across the one of the passage and the cavity;

(c) releasing the ice into the one of the passage and the cavity so as to change the strength of the transmitted acoustical wave;

(d) sensing the change in the strength of the transmitted acoustical wave; and (e) generating a control signal when the change in the strength exceeds a predetermined threshold for more than a predetermined amount of time wherein the control signal is utilized to prevent the ice release mechanism from releasing additional ice.

9. The method as recited in claim 8 wherein the acoustical wave is transmitted across the passage of the delivery chute.

10. The method as recited in claim 9 wherein the resonance is a resonant frequency of the physical structure of the delivery chute.

11. The method as recited in claim 9 wherein the resonance is a resonant frequency of the passage of the delivery chute.

12. The method as recited in claim 8 wherein the acoustical wave is transmitted across the cavity of the storage bin.

13. The method as recited in claim 11 wherein the resonance is a resonant frequency of the cavity of the storage bin.

14. The method as recited in claim 8 wherein the strength of the transmitted acoustical wave is an amplitude.

15. The method as recited in claim 8 wherein the ice release mechanism includes an ice-maker for making ice and wherein the control signal is utilized to prevent the making of ice.

16. The method as recited in claim 8 wherein the step of transmitting the acoustical wave is performed utilizing a speaker.

17. The method as recited in claim 8 wherein the step of sensing the strength of the transmitted acoustical wave and the step of sensing the change in the strength is performed utilizing a microphone.

18. The method as recited in claim 8 wherein the step of transmitting the acoustical wave and the steps of sensing the strength and sensing the change in the strength is performed utilizing a piezoelectric element.

19. The method as recited in claim 8 wherein the step of transmitting the acoustical wave is performed utilizing a solenoid.

20. The method as recited in claim 8 further comprising the step of determining the resonance of the one of the delivery chute and the storage bin prior to step (a).

21. For use with a solid product release mechanism that releases solid products through a delivery chute having a passage for guiding the solid products from the release mechanism to a storage bin, the storage bin for receiving and storing the solid products and having a cavity, a system for controlling the solid product release mechanism to control the level of solid products in the storage bin, the system comprising:

means for transmitting an acoustical wave across the passage of the delivery chute, the acoustical wave having a predetermined frequency based on a resonance of the delivery chute;

a sensor for sensing a strength of the transmitted acoustical wave after the acoustical wave has traversed across the passage;

means for releasing the solid products into the passage of the delivery chute so as to change the strength of the transmitted acoustical wave;

the sensor for sensing the change in the strength of the transmitted acoustical wave; and means for generating a control signal when the change in the strength exceeds a predetermined threshold for more than a predetermined amount of time wherein the control signal is utilized to prevent the solid product release mechanism from releasing additional solid product.

22. The system as recited in claim 21 wherein the resonance is a resonant frequency of the physical structure of the delivery chute.

23. The system as recited in claim 21 wherein the resonance is a resonant frequency of the passage of the delivery chute.

24. The system as recited in claim 21 wherein the strength of the transmitted acoustical wave is an amplitude.

25. For use with a solid product release mechanism that releases solid products through a delivery chute having a passage for guiding the solid products from the release mechanism to a storage bin, the storage bin for receiving and storing the solid products and having a cavity, a system for controlling the solid product release mechanism to control the level of solid products in the storage bin, the system comprising:

means for transmitting an acoustical wave across the cavity of the storage bin, the acoustical wave having a predetermined frequency based on a resonance of the storage bin;

a sensor for sensing a strength of the transmitted acoustical wave after the acoustical wave has traversed across the cavity;

means for releasing the solid products into the cavity of the storage bin so as to change the strength of the transmitted acoustical wave;

the sensor for sensing the change in the strength of the transmitted acoustical wave; and means for generating a control signal when the change in the strength exceeds a predetermined threshold for more than a predetermined amount of time wherein the control signal is utilized to prevent the solid product release mechanism from releasing additional solid product.

26. The system as recited in claim 25 wherein the resonance is a resonant frequency of the cavity of the storage bin.

27. The system as recited in claim 25 wherein the strength of the transmitted acoustical wave is an amplitude.

28. For use with an automatic ice-making machine having an ice release mechanism that releases ice through a delivery chute having a passage for guiding the ice from the ice release mechanism to a storage bin, the storage bin for receiving and storing the ice and having a cavity, a system for controlling the ice release mechanism to control the level of ice in the storage bin, the system comprising:

means for transmitting an acoustical wave across one of the passage of the delivery chute and the cavity of the storage bin, the acoustical wave having a predetermined frequency based on a resonance of one of the delivery chute and the storage bin;

a sensor for sensing a strength of the transmitted acoustical wave after the acoustical wave has traversed across the one of the passage and the cavity;

means for releasing the ice into the one of the passage and the cavity so as to change the strength of the transmitted acoustical wave;

the sensor for sensing the change in the strength of the transmitted acoustical wave; and means for generating a control signal when the change in the strength exceeds a predetermined threshold for more than a predetermined amount of time wherein the control signal is utilized to prevent the ice release mechanism from releasing additional ice.

29. The system as recited in claim 28 wherein the acoustical wave is transmitted across the passage of the delivery chute.

30. The system as recited in claim 29 wherein the resonance is a resonant frequency of the physical structure of the delivery chute.

31. The system as recited in claim 29 wherein the resonance is a resonant frequency of the passage of the delivery chute.

32. The system as recited in claim 29 wherein the acoustical wave is transmitted across the cavity of the storage bin.

33. The system as recited in claim 32 wherein the resonance is a resonant frequency of the cavity of the storage bin.

34. The system as recited in claim 28 wherein the strength of the transmitted acoustical wave is an amplitude.

35. The system as recited in claim 28 wherein the ice release mechanism includes an ice-maker for making ice and wherein the control signal is utilized to prevent the making of ice.

36. The system as recited in claim 28 wherein the means for transmitting the acoustical wave is a speaker.

37. The system as recited in claim 28 wherein the sensor for sensing the strength of the transmitted acoustical wave and for sensing the change in the strength is a microphone.

38. The system as recited in claim 28 wherein the means for transmitting the acoustical wave and the sensor for sensing the strength and sensing the change in the strength is a piezoelectric element.

39. The system as recited in claim 28 wherein the means for transmitting the acoustical wave is a solenoid.

40. The system as recited in claim 28 further comprising means for determining the resonance of the one of the delivery chute and the storage bin.

41. The system as recited in claim 40 wherein the means for determining the resonance comprises:

means for transmitting a plurality of acoustical waves each having a frequency;

the sensor for sensing the frequency of each of the acoustical waves and generating corresponding frequency signals; and means for determining the frequency signal having the lowest frequency.

42. For use with an ice release mechanism that releases ice through a delivery chute having a passage for guiding the ice from the ice release mechanism to a storage bin, the storage bin for receiving and storing the ice and having a cavity, an apparatus for controlling the ice release mechanism to control the level of ice in the storage bin, the apparatus comprising:

a transmitter for transmitting an acoustical wave across one of the passage and the cavity, the acoustical wave having a predetermined frequency based on the resonance of one of the delivery chute or the storage bin;

a sensor for sensing a strength of the transmitted acoustical wave after the acoustical wave has traversed the one of the passage and the cavity;

a controller, coupled to the release mechanism, the transmitter and the sensor, for allowing at least one solid product to fall from the release mechanism into one of the passage and the cavity so as to change the strength of the transmitted acoustical wave;

the sensor for sensing the change in the strength of the transmitted acoustical wave; and the controller for generating a control signal when the change in the strength exceeds a predetermined threshold for more than a predetermined amount of time wherein the control signal is utilized to prevent the solid product release mechanism from releasing additional ice.

43. The apparatus as recited in claim 42 wherein the transmitter is affixed to a wall of the delivery chute for transmitting the acoustical wave across the passage.

44. The apparatus as recited in claim 43 wherein the sensor is affixed to a wall of the delivery chute adjacent the transmitter.

45. The apparatus as recited in claim 43 wherein the sensor is affixed to a wall of the delivery chute opposite the transmitter.

46. The apparatus as recited in claim 42 wherein the transmitter is affixed to a wall of the storage bin for transmitting the acoustical wave across the cavity of the storage bin.

47. The apparatus as recited in claim 46 wherein the sensor is affixed to a wall of the storage bin adjacent the transmitter.

48. The apparatus as recited in claim 46 wherein the sensor is affixed to a wall of the storage bin opposite the transmitter.

49. The apparatus as recited in claim 42 wherein the transmitter and the sensor are affixed to a top portion of the storage bin for transmitting and sensing the acoustical wave across a portion of the cavity of the storage bin and further comprising a deflector plate for deflecting the transmitted acoustical wave for receipt by the sensor, the deflector plate positioned opposite the transmitter and the sensor in the storage bin and having a closed end and an open end, the closed end being secured to the top portion of the storage bin adjacent the transmitter and the sensor and the open end for receiving the ice as the storage bin begins to fill.

50. The apparatus as recited in claim 49 wherein the open end of the deflector plate is at an angle to the closed end of the deflector plate.

51. The apparatus as recited in claim 49 wherein the transmitter and the sensor are the same device.

\* \* \* \* \*